June 30, 1925.  1,544,316

R. HAZELTINE

APPARATUS FOR FORMING TIRE BEADS

Filed May 9, 1924

INVENTOR.
Reginald Hazeltine
Edward C. Taylor
BY
ATTORNEY.

Patented June 30, 1925.

1,544,316

UNITED STATES PATENT OFFICE.

REGINALD HAZELTINE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR FORMING TIRE BEADS.

Application filed May 9, 1924. Serial No. 712,030.

*To all whom it may concern:*

Be it known that I, REGINALD HAZELTINE, a citizen of the United States of America, residing at Chicopee Falls, in the county of Hampden and State of Massachusetts, have invented certain new and useful Improvements in Apparatus for Forming Tire Beads, of which the following is a specification.

This invention relates to an apparatus for forming and vulcanizing articles of rubber or rubberized fabric, and more particularly to the molding of endless rings of plastic material such as beads for pneumatic tires. One object of the invention is to provide an apparatus of this character wherein an endless ring or bead may be positioned in the molding cavity of the mold without the aid of a prying or lifting tool. A further object is to provide suitable means for removing the bead from the mold. Other objects of this invention relate to economies of manufacture and details of construction, as will hereinafter appear from the detailed description to follow.

The invention has been shown as applied to "straight side" beads but it will be understood that it may be applied to clincher beads or rings of other shapes.

The invention will now be described with reference to the accompanying drawings, in which Fig. 1 is a partial top plan view of the mold units with the upper mold member broken away to better show the lower mold member;

Figure 2:
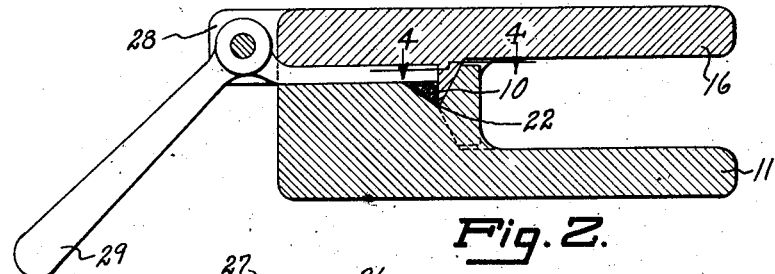
Fig. 2 is a section taken on line 2—2 of Fig. 1 showing the position of the mold sections with respect to each other when assembled in operative position.

When attempts to mold endless rings or tire beads have been made heretofore it has been necessary to lift the ring or bead over the shoulder or inner edge of the mold by means of some convenient prying tool, an ordinary screw driver serving very well for this purpose. By the use of the apparatus shown and described a reliable automatic means for locating the bead in the molding cavity is employed.

The apparatus comprises a mold which I have shown as consisting of two parts enclosing a molding cavity 10. Mold section 11 has an annular mold surface 12 at the base of which are spaced members 13 provided with surfaces 14. The spaced members may be made with a wedge-shaped taper but are preferably made so that surfaces 14 are a part of a frusto-conical surface with circumferential openings 15. Mold section 16 has an annular molding surface 17 and has adjoining it another annular molding surface 18. At the outer edge of the annular molding surface 17 are spaced members 19 provided with a surface 20 which merges with the molding surface 17. Surface 20 of the spaced members 19 is similar to the surface 14 of spaced members 13. The molding surface 12 registers with the molding surfaces 17 and 18, therewith to enclose or define the annular molding cavity 10 having the cross-sectional form desired in the finished article, with plane surface 21 abutting a continuation of molding surface 18 while surfaces 12 and 17 join at 22 to complete the molding cavity. The conical surface 20 is complementary to surface 23 and the conical surface 14 is complementary to surface 24.

Figure 3:
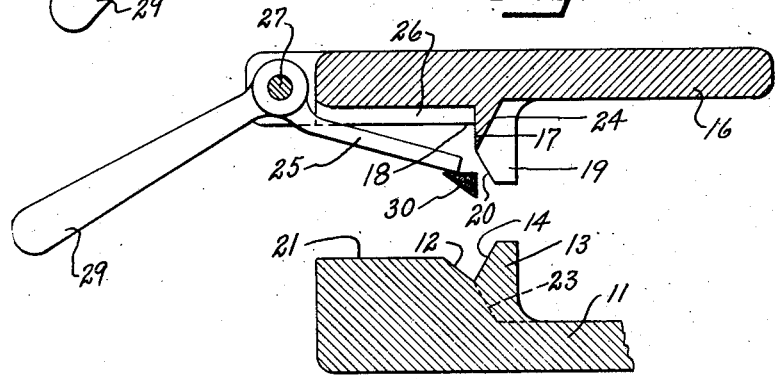
Fig. 3 is a section similar to Fig. 2 showing the mold members separated.

Bead pulling arm 25 fits into groove 26 of mold section 16 and is pivoted on pin 27 supported by lugs 28 of the mold section 16. Handle 29 is so designed that the weight of it will hold the bead pulling arm 25 in place when not in use for removing bead 30 (Fig. 3).

The mold sections 11 and 16 are preferably fixed in a vulcanizing press (not shown) by which the mold sections may be forcibly closed (Fig. 2 showing the mold closed), and the beads are thus vulcanized and molded to the shape desired.

Figure 5:
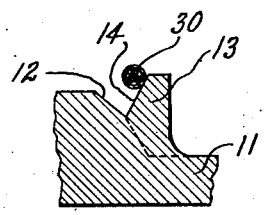
Fig. 5 is a section of the lower mold member with a bead placed in position to be forced into the bead groove.
Figure 4:
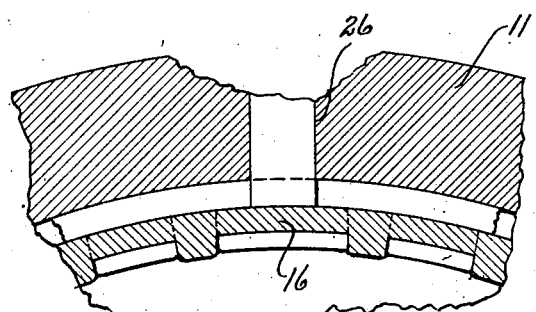
Fig. 4 is a section taken on line 4—4 of Fig. 2.
Figure 6:
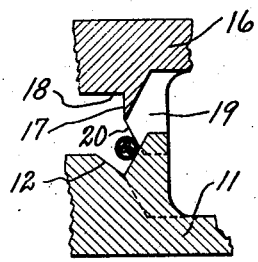
Fig. 6 is a similar view to Fig. 5 with the bead being forced down into the bead groove by the closure of the mold members.
Figure 1:
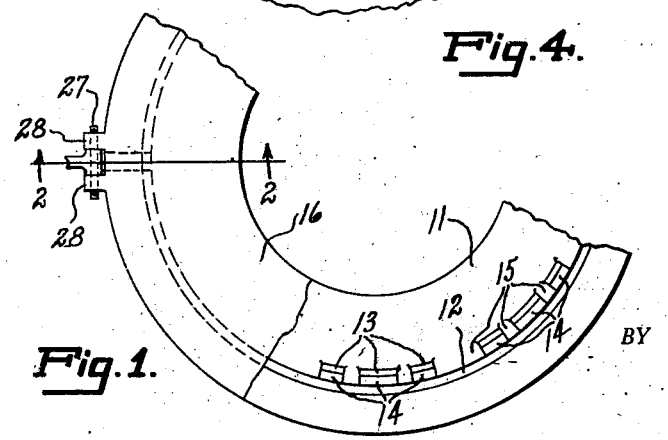

In the manufacture of tire beads by my improved apparatus a tire bead is placed on the tapered surfaces 14 of the lower mold 11 (Fig. 5). As the mold sections 11 and 16 close together the tapered surfaces 20 of mold section 16 will come in contact with the bead 30 (Fig. 6), and as mold sections 11 and 16 continue to close the surfaces 14 and 20 will stretch the bead circumferentially until it has reached a circumference equal to that of the bead supporting surface 17 and then will force it onto the surface 17. The action of the oppositely inclined members on the bead 30 is similar to that of a pair of dull shears on a piece of heavy cord. The members 13 of mold section 11 interfit and coact with members 19 of the mold sections 16 to stretch and automatically force the bead completely into the molding cavity, thereby avoiding the use of a prying tool to position the bead. The beads 30 are thus molded and vulcanized to the desired shape while they are held under pressure and circumferential tension in the mold.

Having thus described my invention, I claim:

1. In an apparatus of the character described a pair of mold members shaped so as to provide a molding cavity when closed together, the two mold members having interfitting portions formed on the surfaces of cones intersecting on a circumference progressively increasing as the mold sections are brought together until, when the mold sections are closed, said circumference merging with the molding cavity.

2. In an apparatus of the character described the combination of a pair of mold sections provided with a plurality of interfitting members, said interfitting members having oppositely inclined surfaces connecting with the molding surfaces of the molding cavity.

3. In an apparatus of the character described the combination of a pair of mold sections, each provided with a plurality of interfitting members, said interfitting members having oppositely inclined surfaces adapted to stretch a ring as the mold members are closed and force the ring into an annular molding cavity.

4. In an apparatus of the character described the combination of a pair of mold sections provided with a plurality of oppositely inclined interfitting members, said mold sections forming a molding cavity when closed together and adapted to support an annular tire bead under circumferential tension.

REGINALD HAZELTINE.